United States Patent
Yoshino

[19]

[11] Patent Number: 6,020,025
[45] Date of Patent: *Feb. 1, 2000

[54] METHOD OF MANUFACTURING A CRANK SHAFT

[75] Inventor: Akira Yoshino, Osaka, Japan

[73] Assignee: Daidousanso Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/424,602

[22] Filed: Apr. 17, 1995

Related U.S. Application Data

[62] Continuation of application No. 08/208,185, Mar. 10, 1994, abandoned, which is a continuation of application No. 08/021,474, Feb. 23, 1993, abandoned, which is a division of application No. 07/852,219, filed as application No. PCT/JP91/01597, Nov. 20, 1991, abandoned.

[30] Foreign Application Priority Data

Nov. 20, 1990 [JP] Japan ..................................... 2-316561

[51] Int. Cl.$^7$ ................. B05D 5/00; C21D 1/06
[52] U.S. Cl. .......... 427/258; 427/282; 427/287; 427/255.4; 427/255.7; 427/402; 148/230; 148/238; 148/904
[58] Field of Search ................. 427/248.1, 258, 427/282, 314, 287, 255.7, 255.4, 307, 533, 534, 402; 148/230, 238, 904; 74/595

[56] References Cited

U.S. PATENT DOCUMENTS

| | | |
|---|---|---|
| 4,761,117 | 8/1988 | Oda et al. ............................ 416/241 R |
| 4,975,147 | 12/1990 | Tahara et al. . |
| 5,013,371 | 5/1991 | Tahara et al. .......................... 148/16.6 |
| 5,108,543 | 4/1992 | Suzuki et al. ........................... 156/643 |
| 5,112,030 | 5/1992 | Tahara et al. . |
| 5,114,500 | 5/1992 | Tahara et al. . |
| 5,141,567 | 8/1992 | Tahara et al. . |
| 5,203,228 | 4/1993 | Miyawaki et al. .................... 75/579 R |

FOREIGN PATENT DOCUMENTS

| | | |
|---|---|---|
| 58-91351 | 5/1983 | Japan . |
| 58-160618 | 9/1983 | Japan . |
| 1-158212 | 6/1989 | Japan . |

*Primary Examiner*—Roy V. King
*Attorney, Agent, or Firm*—Armstrong, Westerman, Hatttori, McLeland & Naughton

[57] ABSTRACT

A crank shaft is constructed only at the surface layer of a journal portion with a hard nitride layer, so that the resultant crank shaft is available at a low cost, not so heavy and excellent in durability in comparison with a case employing a hard material for the whole crank shaft. Also, a method of manufacturing a crank shaft according to the present invention employs fluorinating process prior to nitriding process to change a passive coat layer, such as oxide layer on the surface of the journal portion to a fluoride layer, which protects the same surface. Therefore, even when there is space of time between formation of fluoride on the surface of the journal portion and nitriding process, the fluoride layer protects and keeps the surface of the journal portion in a favorable condition, resulting in that re-formation of oxide layer on that surface is prevented.

4 Claims, 3 Drawing Sheets

METHOD OF MANUFACTURING A CRANK SHAFT

This application is a continuation of application Ser. No. 08/208,185, filed Mar. 10, 1994, now abandoned, which was a continuation of Ser. No. 08/021,474, filed Feb. 23, 1993, now abandoned; which was a division of Ser. No. 07/852,219, filed May 28, 1992 now abandoned, which is a national stage application of PCT/JP91/01597, filed Nov. 20, 1991.

FIELD OF THE INVENTION

The subject invention relates to a crank shaft of which a journal portion is formed with a hard nitride layer so as to have remarkably improved properties such as durability and also to a method of manufacturing the crank shaft.

BACKGROUND OF THE INVENTION

Generally, a crank shaft 22 for engine is, as shown in FIG. 4, rotatably supported at its journal portions 22a by bearings 23 provided in a crank case 21 of engine 20. Pins 22b are connected with connecting 24 in a manner of being freely rotatable, so that a force applied to the crank shaft 22 tends to cause the crank shaft 22 to be bent around the bearings 23 when a piston 26 is moved down due to an explosion in a combustion chamber 25. Therefore, the journal portions 22a in association with bearing metals 27 of the bearings 23 are required to have high durability.

Hence, specific kinds of steel materials having high durability are selected for the crank shaft 22 to improve durability at its journal portions 22a. This, however, leads to problems such as an increase in the cost of materials and in weight.

The present invention has been designed to overcome the above problems. An object of the present invention is to improve the durability of the journal portions of the motor rotary shaft without an increase in the cost of materials and in weight.

SUMMARY OF THE INVENTION

To achieve the above object, the invention of this application is directed to a crank shaft having a journal portion whose surface layer includes a hard nitride layer. To provide such hard nitride layer the invention is also directed to a manufacturing method for a crank shaft wherein the journal portion of the crank shaft is held in a fluorine- or fluoride-containing gas atmosphere under a heated condition and a fluoride layer is formed on the surface of the journal portion. Thereafter, such journal portion is held in a nitride atmosphere under a heated condition and a hard nitride layer is formed on the surface of the journal portion.

In detail, the crank shaft of the present invention is constructed, at the surface layer of the journal portion, with a hard nitride layer but does not employ a hard materials for the whole crank shaft, thereby providing a crank shaft at a low cost, which is not heavy and is excellent in durability. In the manufacturing of the crank shaft the journal portion of the shaft is first held in a fluorine- or fluoride-containing gas atmosphere, under a heated condition, to form a fluoride layer on the surface of the journal portion, and is then held in a nitride atmospheres under a heated condition, to remove the formed fluoride layer from the surface of the journal portion and simultaneously form a hard nitride layer on surface of the journal portion from which the flouride layer is removed as such flouride layer is being removed. The formation of fluoride layer on the surface of the journal portion is carried out before nitriding to purify and, at the same time, activate the surface of the journal portion, so that the nitride layer can be uniformly and rather deeply formed on the surfaces of the journal portion. Thus the hard nitride layer can be uniform and thick in thickness.

DETAILED DESCRIPTION OF THE PREFERRED EMBODIMENTS

Next, details of the present invention are described below.

The fluorine- and fluoride-containing gas to be used for fluorinating process in the present invention is an inactive gas, such as $N_2$ containing at least one of the fluorine source components, such as $NF_3$, $BF_3$, $CF_4$, $HF$, $SF_6$, and $F_2$. $NF_3$ is most preferable and useful in respect of reactivity, handling properties, and the like for the purpose of the invention.

In the nitriding process of the manufacturing method according to the present invention, the crank shaft made of a steel, such as stainless steel, and with the portions of the shaft other than the journal portion being masked by a coating of a known anti-hardening agent and the journal portion is held, as aforementioned, in the fluorine- or fluoride-containing gas atmosphere under a heated condition at 250 to 400° C. when $NF_3$ is used, for example, to form fluoride layer on the surface of the journal portion. Thereafter, the journal portion is subjected to nitriding (or carbon nitriding) using a known nitriding gas such as ammonia. The concentration of the fluorine source components such as $NF_3$ in the fluoride gas is, for example, 1000 to 100000 ppm, preferably 20000 to 700000 ppm and most preferably 30000 to 50000 ppm. The time for holding the journal portion in the fluorine- or fluoride-containing gas may be selectively set corresponding to kinds of steel materials, shapes and sizes of the crank shaft, heating temperatures or the like and it is generally a few minutes or scores of minutes.

Figure 1:
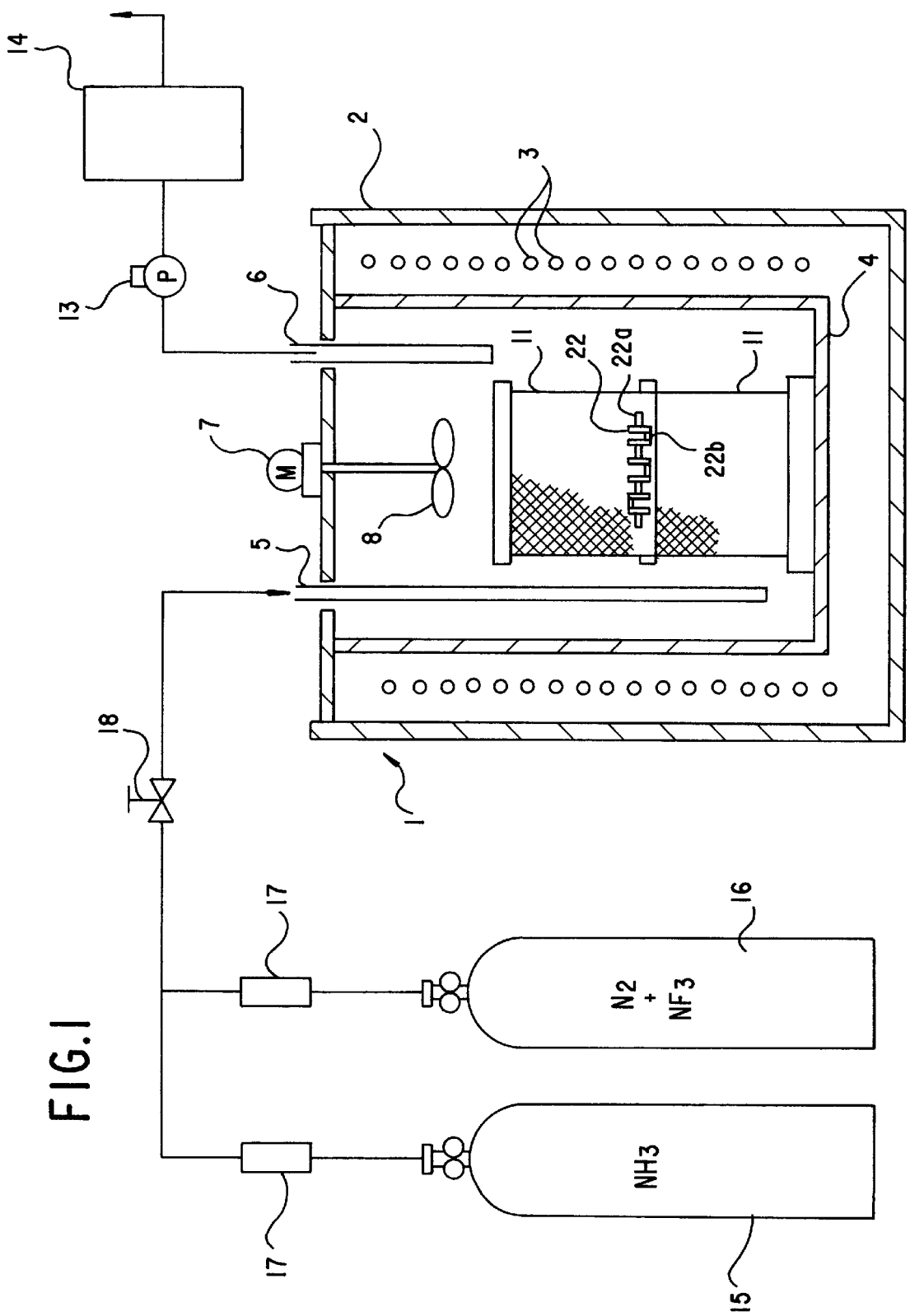
FIG. 1 is a schematic sectional view showing a heat treatment furnace used in an example of the present invention.

The manufacturing process of the present invention will be further detailed. A journal portion 22a of a crank shaft 22 shown in FIG. 4 which is made of steel and masked at portions other than the journal portion may be cleaned so as to be degreased and then placed in a heat treatment furnace 1 as shown in FIG. 1. The heating furnace 1 is a pit furnace comprising an outer shell 2, a heater 3 provided therein and an inner container 4 disposed inside the heater 3. A gas guide line 5 and an exhaust pipe 6 are inserted into the pit furnace. Gas is fed to the gas guide line 5 from cylinders 15 and 16 through a flow meter 17 and a valve 18 and the like. The atmosphere inside the pit furnace is agitated by a fan 8 which is rotated by a motor 7. The crank shaft 22 is held in a metallic container 11 to be placed in the furnace. In the drawing, reference numeral 13 denotes a vacuum pump and 14 denotes a noxious substance eliminator. Fluorine- or fluoride-containing gas, for example a mixed gas of $NF_3$ and $N_2$, is injected into the furnace and heated to a predetermined reaction temperature. $NF_3$ generates active fluorine at 250 to 400° C., so that organic and inorganic contaminants on the surfaces of the journal portion 22a are removed. The generated fluorine simultaneously is reacted with Fe, chrome substrate or oxides such as FeO, $Fe_3O_2$, and $Cr_2O_3$ on the surface of the journal portion 22a as represented in the following reaction formulae, thereby forming on the surface of the journal portion 22a a quite thin fluoride layer containing therein such compounds as $FeF_2$, $FeF_3$, $CrF_2$, and $CrF_4$.

$$FeO+2F \rightarrow FeF_2+1/2O_2$$

$$Cr_2O_3+4F \rightarrow 2CrF_2+3/2O_2$$

The reaction changes the oxide layer on the surfaces of journal portion 22a to a fluoride layer and removes $O_2$ adsorbed on the same surface. The fluoride layer is stable at temperatures below 600° C. when there exists no $O_2$, $H_2$, nor $H_2O$, to thereby prevent formation of an oxide layer and adsorption of $O_2$ on and by the metallic substrates. Also, according to the fluorinating process, the fluoride layer is formed on the surface of the furnace materials at the initial stage, so that the fluoride layer thereafter prevents possible damage to the surfaces of the furnace materials due to application of fluorine- or fluoride-containing gas. The journal portion 22a duly treated with fluorine- or fluoride-containing gas is further heated to a nitriding temperature of 480 to 700° C. and applied in this state with $NH_3$ gas or a mixed gas of $NH_3$ and a gas containing carbon sources (such as RX gas), whereby the aforesaid fluoride layer is reduced or broken by $H_2$ or trace amount of water as represented by the following formulae, thereby causing the active metallic substrates to be formed and exposed.

$$CrF_4+2H_2 \rightarrow Cr+4HF$$

$$2FeF_3+3H_2 \rightarrow 2Fe+6HF$$

Simultaneously with formation of the activated metallic substrates, active N atoms enter and disperse in the metal. As a result, a solid compound layer (nitride layer) containing such nitrides as CrN, $Fe_2N$, $Fe_3N$, and $Fe_4N$ is formed on the surfaces of the metallic substrate. Then, the foregoing masking of the rotary shaft 22 is duly removed.

The conventional nitriding process forms similar nitride layers to the above but it has a lower activity on the substrates surfaces due to oxidized layer formed thereon during elevation of temperatures from normal room temperatures to nitriding temperatures or $O_2$ adsorbed at that time, so that the degree of adsorption of N atoms on the substrates surfaces is low and not uniform. The non-uniformity is increased also by the fact that it is practically impossible to keep the degree of decomposition of $NH_3$ uniformly in the furnace. According to the manufacturing process of the present invention, adsorption of N atoms on the surface of the journal portion 22a is carried out uniformly and quickly to thereby prevent the above problem while providing the solid nitride layer.

Figure 2:
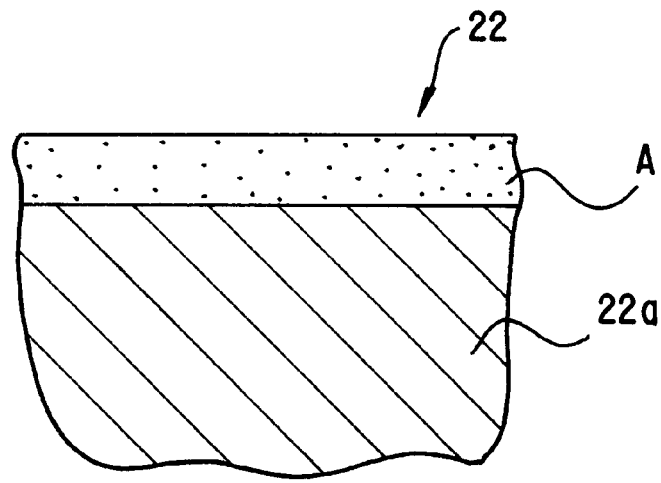
FIG. 2 is a sectional view showing a condition of a nitride layer formed on a journal portion of a crank shaft.

The resultant crank shaft 22 in which the surface layer of its journal portion 22a includes a hard nitride layer A as shown in FIG. 2 is thereby excellent in durability.

Figure 3:
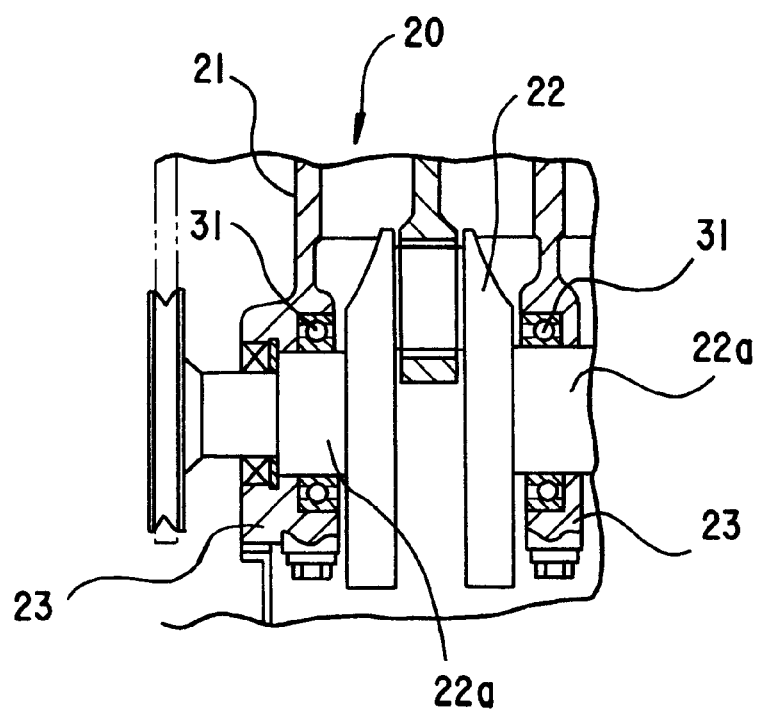
FIG. 3 is a sectional view showing principal parts of engines provided with respective crank shafts.
Figure 4:
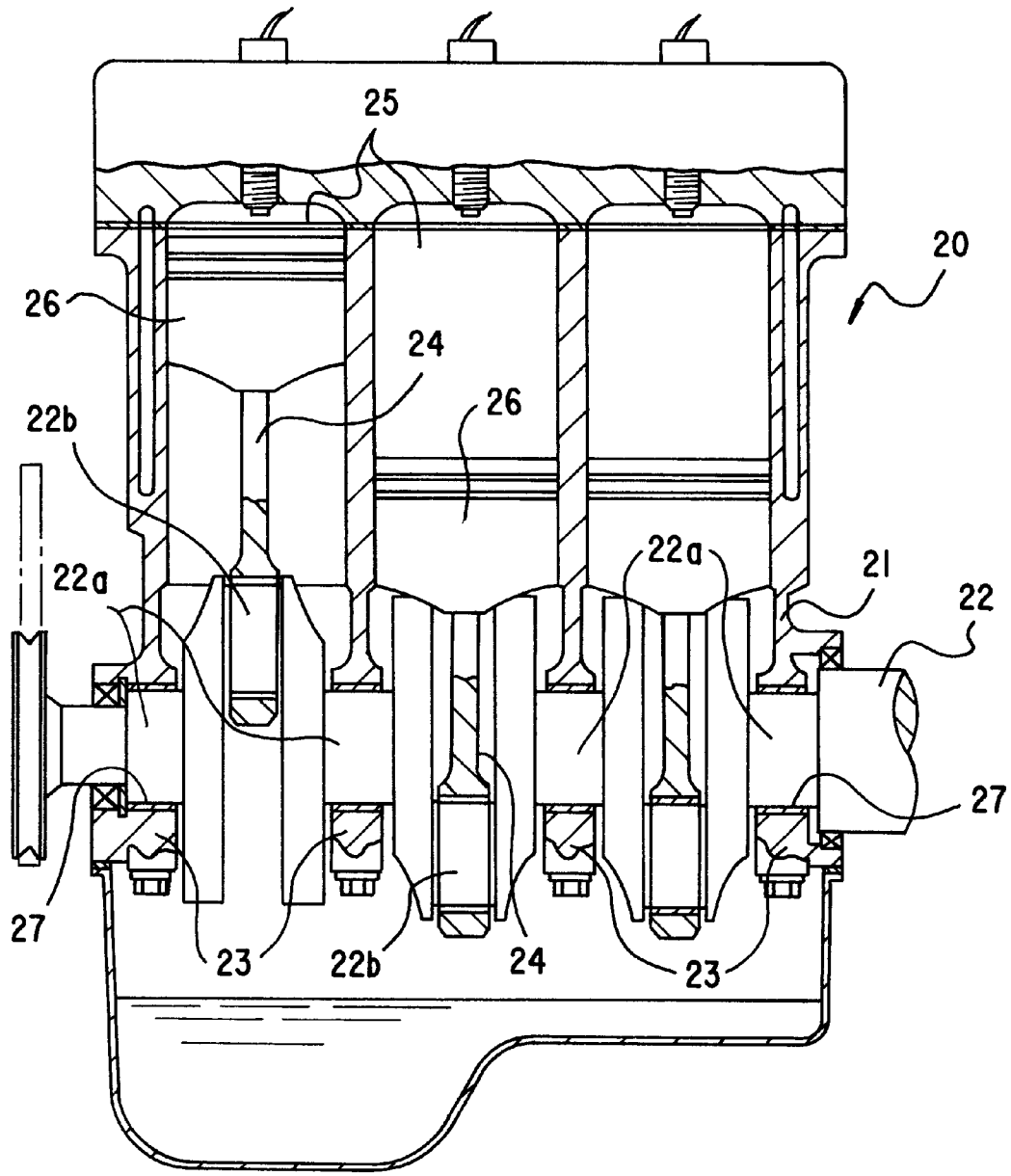
FIG. 4 is a sectional view showing principal parts of a conventional crank shaft for engine.

An engine 20 shown in FIG. 3 is substantially identical with that of FIG. 4 except that it uses a ball bearings 31 for the bearings of the crank shaft 22. In this case, the ball bearing 31 (particularly the rolling member, such as balls, and ball races) are nitrided together with the journal portion 23 of said crank shaft 22 by the nitriding process according to the present invention, whereby the ball bearings 31 themselves can be reduced in frictional resistance and further rigidly fitted to the journal portions 22a.

The nitriding process of the manufacturing method according to the present invention may be applied to the whole crank shaft 22, not merely to the journal portion as referred to in the above example.

Although steel is used for the crank shaft in the above-mentioned example, metallic materials other than steel such as aluminium and may be used for the crank shaft and the same effect as above can be obtained.

As seen from the above, the crank shaft of the present invention is constructed such that the surface layer of the journal portion has a hard nitride layer but does not employ a hard materials for the whole crank shaft. Consequently, a crank shaft is obtainable at a low cost, and which is not heavy and is excellent in durability. Also, the crank shaft of the present invention can reduce in resistance to sliding to about one third with the solid nitrided layer, and thereby realize a saving of the coolant or the like. Furthermore, as above-mentioned, in the manufacturing method according to the present invention, the fluorinating is carried out before the nitriding process to change the passive coat layer such as the oxide layer on the surface of the journal portion to a fluoride layer which protects the same surface. Therefore, even when there is an interval of time between the formation of fluoride layer on the journal portion and the nitriding process, the fluoride layer protects and keeps the surface of the journal portion in a favorable condition such that re-formation of oxide layer on that surface is prevented. The fluoride layer is then decomposed and removed in the subsequent nitriding process to cause the surface of journal portion to be exposed. Since the exposed metal surface is activated, N atoms in the nitriding process readily, deeply and uniformly disperse into the journal portion, thereby forming the surface layer of the journal portion into a thick and uniform hard nitrided layer.

Next, the present invention will be further described according to an example.

EXAMPLES

Journal portions and pins of a crank shaft (300×φ25 mm) made of SUS316 stainless steel were washed with trichloroethane. The washed shaft was masked at its portions other than the journal portions and pins and then placed in a heat treatment furnace 1 as shown in FIG. 1 to be held in $N_2$ gas atmosphere containing 5000 ppm of $NF_3$ at 300° C. for 15 minutes. This treatment was followed by heating to 530° C. and introducing a mixed gas of 50% of $NH_3$+50% of $N_2$ into the heat treatment furnace 1 to perform nitriding of the shaft for a period of 3 hours. Then, the crank shaft was air-cooled and taken out of the furnace. The thickness of the nitride layer of the journal portion and pins of the crank shaft were 10 to 70 μm, and the surface hardnesses of the nitride layers were 1000 to 1350 Hv and the hardness was substantially higher than that obtained by the conventional nitriding method.

What is claimed are:

1. A method of manufacturing a crank shaft made of austenitic stainless steel comprising masking portions other than a journal portion of the crank shaft, holding the journal portion of the crank shaft in a fluorine- or a fluoride-containing gas atmosphere having a concentration of fluorine source component of 1000 to 5000 ppm, wherein at least one fluorine source component is selected from $NF_3$, $BF_3$, $CF_4$, HF, $SF_6$, and $F_2$ and is contained in an inactive gas, under a heated condition at a temperature of 250 to 400° C. to form a fluoride layer on the surface of the journal portion, removing said fluorine- or fluoride-containing gas atmosphere from contact with said journal portion, thereafter further holding the journal portion of the crankshaft with said fluoride layer on the surface of the journal portion in a nitrogen-containing atmosphere containing $NH_3$ under a heated condition at a temperature of 480 to 700° C. to form a nitride layer having a thickness of 10 to 70 μm and a surface hardness of 1000 to 1350 Hv on the surface of the journal portion, and thereafter removing said masking.

2. A method of manufacturing a crank shaft made of austenitic stainless steel comprising masking portions other than a journal portion of the crank shaft, holding the journal portion of the crank shaft in a fluorine- or a fluoride-containing gas atmosphere having a concentration of fluorine source component of 1000 to 5000 ppm, wherein at least one fluorine source component selected from $NF_3$, $BF_3$, $CF_4$, HF, $SF_6$, and $F_2$ and is contained in an inactive gas, under a heated condition at a temperature of 250 to 400° C. to form a fluoride layer on the surface of the journal portion, thereafter further holding the journal portion of the crankshaft with said fluoride layer on the surface of the journal portion in a nitrogen-containing atmosphere containing $NH_3$ under a heated condition at a temperature of 480 to 700° C. to remove the fluoride layer and form a nitride layer having a thickness of 10 to 70 μm and a surface hardness of 1000 to 1350 Hv on the surface of the journal portion, and thereafter removing said masking.

3. A method of manufacturing a crank shaft made of austenitic stainless steel comprising masking portions other than journal and pin portions of the crank shaft, holding the journal and pin portions of the crank shaft in a fluorine- or a fluoride-containing gas atmosphere having a concentration of fluorine source component of 1000 to 5000 ppm, wherein at least one fluorine source component is selected from $NF_3$, $BF_3$, $CF_4$, HF, $SF_6$, and $F_2$ and is contained in an inactive gas under a heated condition at a temperature of 250 to 400° C. to form a fluoride layer on the surface of the journal and pin portions, removing said fluorine- or fluoride-containing gas atmosphere from contact with said journal and pin portions, thereafter further holding the journal and pin portions of the crankshaft with said fluoride layer on the surface of the journal and pin portions in a nitrogen-containing atmosphere containing $NH_3$ under a heated condition at a temperature of 480 to 700° C. to form a nitride layer having a thickness of 10 to 70 μm and a surface hardness of 1000 to 1350 Hv on the surface of the journal and pin portions, and therefore removing said masking.

4. A method of manufacturing a crank shaft made of austenitic stainless steel comprising masking portions other than journal and pin portions of the crank shaft, holding the journal and pin portions of the crank shaft in a fluorine- or a fluoride-containing gas atmosphere having a concentration of fluorine source component of 1000 to 5000 ppm, wherein at least one fluorine source component is selected from $NF_3$, $BF_3$, $CF_4$, HF, $SF_6$, and $F_2$ and is contained in an inactive gas under a heated condition at a temperature of 250 to 400° C. to form a fluoride layer on the surface of the journal and pin portions, thereafter further holding the journal and pin portions of the crank shaft with said fluoride layer on the surface of the journal and pin portions in a nitrogen-containing atmosphere containing $NH_3$ under a heated condition at a temperature of 480 to 700° C. to remove the fluoride layer and form a nitride layer having a thickness of 10 to 70 μm and a surface hardness of 1000 to 1350 Hv on the surface of the journal and pin portions, and thereafter removing said masking.

\* \* \* \* \*